(12) United States Patent
Materna (10) Patent No.: US 6,390,668 B1
(45) Date of Patent: May 21, 2002

(54) BLACKBODY SOURCE USING A HEAT PIPE PRINCIPLE AND TRANSITION REGION

(76) Inventor: Peter Albert Materna, 81 Rector St., Metuchen, NJ (US) 08840-1540

( * ) Notice: Subject to any disclaimer, the term of this patent is extended or adjusted under 35 U.S.C. 154(b) by 11 days.

(21) Appl. No.: 09/602,947

(22) Filed: Jun. 26, 2000

Related U.S. Application Data (63) Continuation-in-part of application No. 09/209,326, filed on Dec. 11, 1998, now Pat. No. 6,106,281.

(51) Int. Cl.[7] .......................... G01K 15/00; G01J 5/00; F27B 19/00; H05B 1/00

(52) U.S. Cl. ............................ 374/2; 374/1; 374/121; 432/90; 392/394; 219/494; 219/502

(58) Field of Search ................ 374/1–2, 121, 374/16; 432/90, 91; 122/508, 492, 459; 126/350.2; 219/494, 502; 392/394, 403; 250/252.1, 493.1, 495.1, 503.1, 504

(56) References Cited

U.S. PATENT DOCUMENTS

| | | | |
|---|---|---|---|
| 3,419,709 A | | 12/1968 | De Bell |
| 3,699,343 A | | 10/1972 | Stein et al. |
| 3,812,596 A | * | 5/1974 | Wilmanns ................ 34/51 |
| 3,851,527 A | * | 12/1974 | Hofman et al. ............ 73/368 |
| 5,703,276 A | * | 12/1997 | Flanigan ................ 73/1.02 |
| 6,232,614 B1 | * | 5/2001 | Gcristy et al. .......... 250/504 R |

FOREIGN PATENT DOCUMENTS

| JP | 0034285 | * | 3/1979 | .................. 374/2 |
|---|---|---|---|---|

OTHER PUBLICATIONS

Web Site—Microgravity News, Advanced Technology Development Projects (NASA)—p. 5 Isothermal Furnace Liner, No Date.
Web Site—Land Infrared General Sales Literature About Blackbody Sources, No Date.
Web Site—Mikron General Sales Literature About Blackbody Sources, No Date.

* cited by examiner

Primary Examiner—Diego Gutierrez
Assistant Examiner—Gail Verbitsky
(74) Attorney, Agent, or Firm—Peter Materna (57) ABSTRACT

A source of thermal radiation for calibrating or testing infrared thermometers or detectors, in which improved temperature uniformity of the radiation-emitting surface is achieved by supplying heat to that surface by condensation of a working fluid as in a heat pipe. With appropriate selection of the working fluid, a wide range of temperatures is possible. Air convection currents at the radiation-emitting opening of the device may be suppressed by creation of a transition region of heated air by a baffle and air heater, further improving the temperature uniformity of the radiation-emitting surface.

14 Claims, 6 Drawing Sheets

BLACKBODY SOURCE USING A HEAT PIPE PRINCIPLE AND TRANSITION REGION

LINK TO RELATED APPLICATION

This patent application is a continuation-in-part of application Ser. No. 09/209,326, filed Dec. 11, 1998, same inventor, titled "Method of reducing the flow of gas a chamber with controlled temperature and controlled composition of gas," now U.S. Pat. No. 6,106,281, issued Aug. 22, 2000.

FIELD OF THE INVENTION

This invention pertains to the field of infrared thermometry and detectors.

BACKGROUND OF THE INVENTION

Infrared thermometry is a useful means of measuring temperature, in part because it can measure the temperature of an object without making physical contact with the object. Its applications range from measuring the temperature of baths of molten metal to measuring the temperature of the human body by measuring the temperature of the eardrum. In the latter application, temperature measurement accuracies of a fraction of a degree Celsius are routinely achieved.

Infrared thermometry works on the principle that any object emits radiant thermal energy to any other object which is at a different temperature, and the spectral characteristics (essentially, color) of this emitted radiation are indicative of the temperature of the emitting object. The wavelength at which the peak magnitude of the emitted radiation occurs is a function of temperature and the relationship is given by Wien's Law, which states that the wavelength of peak radiation is inversely proportional to the absolute temperature of the radiating body. This is described in Handbook of Heat Transfer, by Rohsenow and Hartnett (1973) and other reference books. For temperatures around or moderately above room temperature, the wavelength of the radiation peak is in the infrared region of the electromagnetic spectrum. Total radiated energy is given by Planck's law (or Stefan-Boltzmann law), which includes a proportionality to the fourth power of the absolute temperature.

In radiant heat transfer, the term blackbody receiver or hohlraum is used to refer to a perfect receiver of radiant heat transfer. It is a body to which heat can be radiated, but from which radiant heat is not re-emitted, such as by reflection. The reason for the term black is to denote that ideally the body is fully absorptive, i.e., has an effective absorptivity equal to 1, which is usually associated with the color black. Along with this, the body would have no reflectivity, i.e., reflectivity=0. By definition, for a non-transmissive surface, absorptivity+reflectivity=1. For real materials, absorptivity and reflectivity only approach but never perfectly equal one and zero respectively. This brings on the next strategy for creating a blackbody receiver, which is geometry. A blackbody receiver is typically an enclosure having only a small opening through which thermal radiation enters. For reasons of symmetry and simplicity, the enclosure is most commonly described as a sphere having a small circular opening. Radiation which enters the receiver and undergoes reflection instead of absorption at its first impact with the surface will mostly be reflected to some other portion of the interior surface away from the opening, where most of it will be absorbed except for a still smaller portion which reflects to yet another portion of the interior surface, etc. As a result of those multiple internal reflections at various angles, essentially none of the entering radiation returns to the opening through which it entered. Designing the opening to be small compared to the overall dimensions helps achieve this. As a result, the blackbody receiver operates as an essentially perfect receiver despite the somewhat imperfect absorptivity of the interior surface of the blackbody.

One of the requirements for successful infrared thermometry is to calibrate the measuring device by exposing it to thermal radiation from an object whose temperature is known. This object is referred to as a blackbody source. A blackbody source is essentially a blackbody receiver which is maintained above ambient temperature. All of these considerations just discussed about blackbody receivers apply to a blackbody source, such as a desire for high emissivity (similar to absorptivity) of the surface and also the geometric considerations. A blackbody source typically is the internal surface of a nearly complete hollow sphere with a small hole, and is black inside. Such blackbody sources are commercially available, for example, from Mikron Instruments, Oakland, N.J. and other vendors. In the case of emitting radiation for use in calibration, an important consideration is that the radiating surface of the blackbody source should all be maintained at a uniform temperature. If temperature nonuniformities of the radiating surface were present such a source would still emit thermal radiation, but the spectral peak would be more spread out or less well-defined, and this would make the radiation source less useful for calibration purposes. Similar considerations apply if the radiation source is used for any other form of infrared radiation detector for either calibration or testing.

Present blackbody sources typically use electrical resistive heaters to directly heat the hidden side of the radiating surface of the blackbody source to an elevated temperature. The local temperature distribution of the radiating surface is influenced by possible nonuniformity of heat generation due to heater design and spacing. Locations closer to the heaters will be hotter than locations between the heaters. The local temperature distribution of the radiating surface is also influenced by convective heat transfer to the surrounding gas. The temperature difference between the hot radiating body and the surrounding atmosphere creates flow patterns in the surrounding atmospheric gas and in the hot gas occupying the interior of the blackbody source. These flow patterns are such that, due to buoyancy, hot air spills out of the opening and rises, and its place is taken by cold atmospheric air entering the enclosed concave region.

The entering cool air inside the blackbody source tends to make the lower part of the radiating surface cooler than the upper part. These effects can be expected to become more prominent as the size of the blackbody source increases. There are also two possible effects tending to even out or smooth out the temperature distribution. One of these is radiant heat transfer between different portions of the radiating surface facing each other. The effect rapidly increases in importance with temperature (as the fourth power of the absolute temperature) and is described by the view factor which is tabulated as a function of geometry in reference books such as Serafim and Hottel. Another process tending to even out temperature nonuniformities is conduction of heat laterally along the surface of the blackbody radiating surface.

All of these considerations affect the uniformity of the temperature of the entire interior surface of the blackbody source, and the first two impose limitations on the achievable uniformity. Accordingly, it would be useful to have a blackbody source having improved temperature uniformity of the radiating surface.

BRIEF DESCRIPTION OF THE FIGURES

The present invention is shown in the following figures, of which a brief description is given here.

DETAILED DESCRIPTION OF THE INVENTION

The invention is a blackbody source to whose radiating surface heat is delivered by condensing vapor, resembling the condensing end of a heat pipe. Optionally, the invention also uses a particular design at the opening to control convective air flow patterns which are a contributor to temperature nonuniformity of the radiating surface.

The present invention uses condensation such as in heat pipe technology as a promoter of temperature uniformity. Heat pipes are an essentially passive device with unique capabilities in heat transport and management. Heat pipes can transport heat from one location to another with an apparent thermal conductance far exceeding that of even the best solid-material thermal conductors (e.g., copper) of the same dimensions. Heat pipes are useful in the design of high-powered electronics and are even used in some laptop personal computers.

Heat pipes consist of a fluid enclosed inside a specifically-shaped pressure vessel, usually elongated, having an evaporating region or end and a condensing region or end. The fluid sealed inside undergoes repeated condensation and evaporation, travelling from one end or region of the heat pipe to the other end or region and back, accepting heat from one region and delivering heat to the other region. In general, both boiling (especially pool boiling) and condensation (especially dropwise) are known for their large heat transfer coefficients, which accomplish large amounts of heat transfer for modest temperature differences. The use of the latent heat of evaporation of phase change provides the ability to absorb or release significant amounts of heat at essentially constant temperature. Various fluids are used as working fluids inside heat pipes, including ammonia, alcohols, fluorocarbons, chlorocarbons, chlorofluorocarbons, hydrochlorofluorocarbons, other halocarbons and halogenated hydrocarbons, water, other organics and metals with appropriate boiling points, typically low melting point metals such as mercury, sodium, potassium, sodium-potassium mixtures, lithium, cesium, rubidium, etc. These possible working fluids are listed approximately in order of increasing operating temperature. The choice of fluid is determined in large part by the intended operating temperature range of the heat pipe. Usually noncondensables such as air or atmospheric gases are excluded from the working fluid region to the greatest extent possible, because noncondensables degrade the performance of a heat pipe. Typically there is a range of temperatures over which any given heat pipe will work, with the adjustment being made by the pressure inside the heat pipe.

In the simplest of heat pipes the return of condensed liquid from the condenser end or region to the evaporator end or region is by gravity. However, it is also common to engineer the return of condensed liquids by use of capillary passages or porosity which use the surface tension of the liquid as a driver to cause the return flow of liquid to the evaporating end. With such designs, heat pipes can operate against gravity or in the absence of gravity.

The heat pipe principle can be used in a non-elongated geometry to make what is referred to as an isothermalizing pad. The geometry is not long and narrow but rather flat and thin. Within this geometry, at whatever is a local hot spot, evaporation of the working fluid takes place. The vapor created by that evaporation travels to other parts of the isothermalizing pad, where it condenses. Meanwhile, other liquid travels toward the hot spot to take the place of the evaporated liquid, driven by surface tension which causes liquid to flow towards and fill a dry spot. An isothermalizing pad essentially functions as a membrane of high apparent thermal conductivity in the lateral directions. With elongated heat pipes there are two well-defined ends, and sometimes each individual end is specifically designed to be either the evaporator end or the condenser end. With an isothermalizing pad the evaporator can be anyplace, wherever heat is applied, and the condenser is all of the rest of the isothermalizing pad. It is believed that, because of the high heat transfer coefficients at evaporation and condensation, an isothermalizing pad can maintain temperature uniformity to within a fraction of a degree Celsius, for reasonable heat loads. All of these devices are known and are commercially available, for example, from vendors such as Thermacore (Lancaster, Pa.) and Dynatherm (Hunt Valley, Md.). At elevated temperatures, liquid metal heat pipe technology has been proposed as an isothermalizing liner for furnaces for materials processing such as semiconductor crystal growth.

Figure 1:
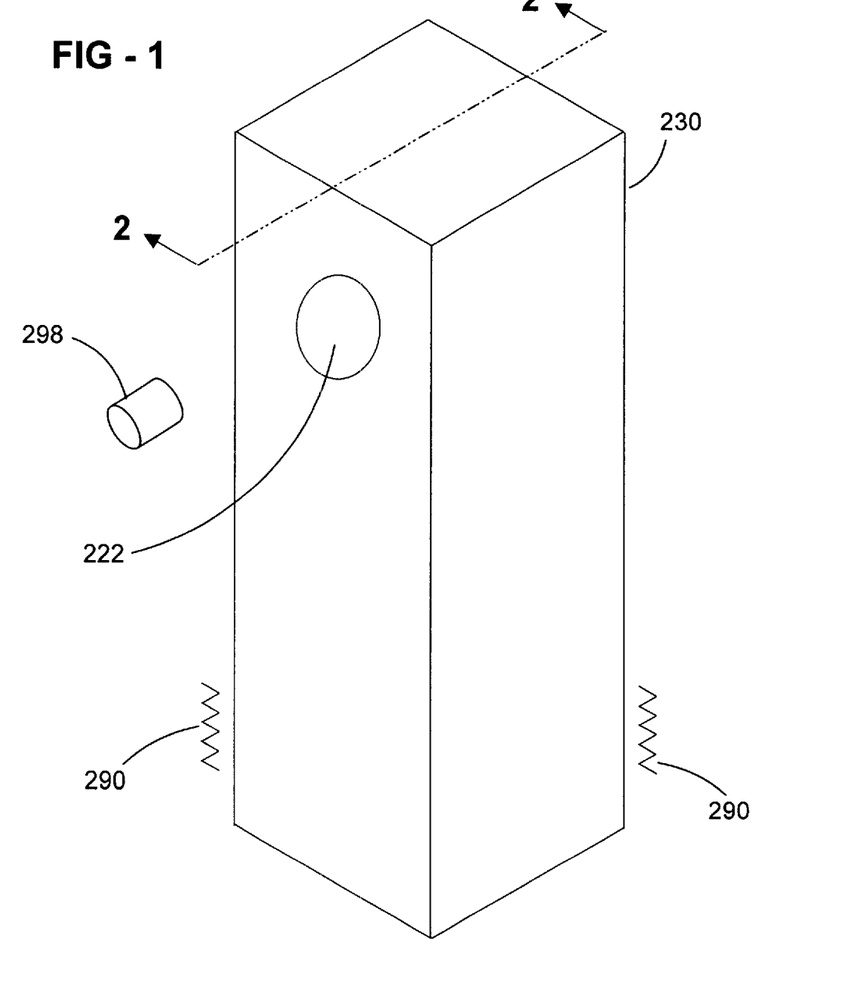
FIG. 1 shows a three-dimensional view of the blackbody source of the present invention using the heat pipe principle.
Figure 2:
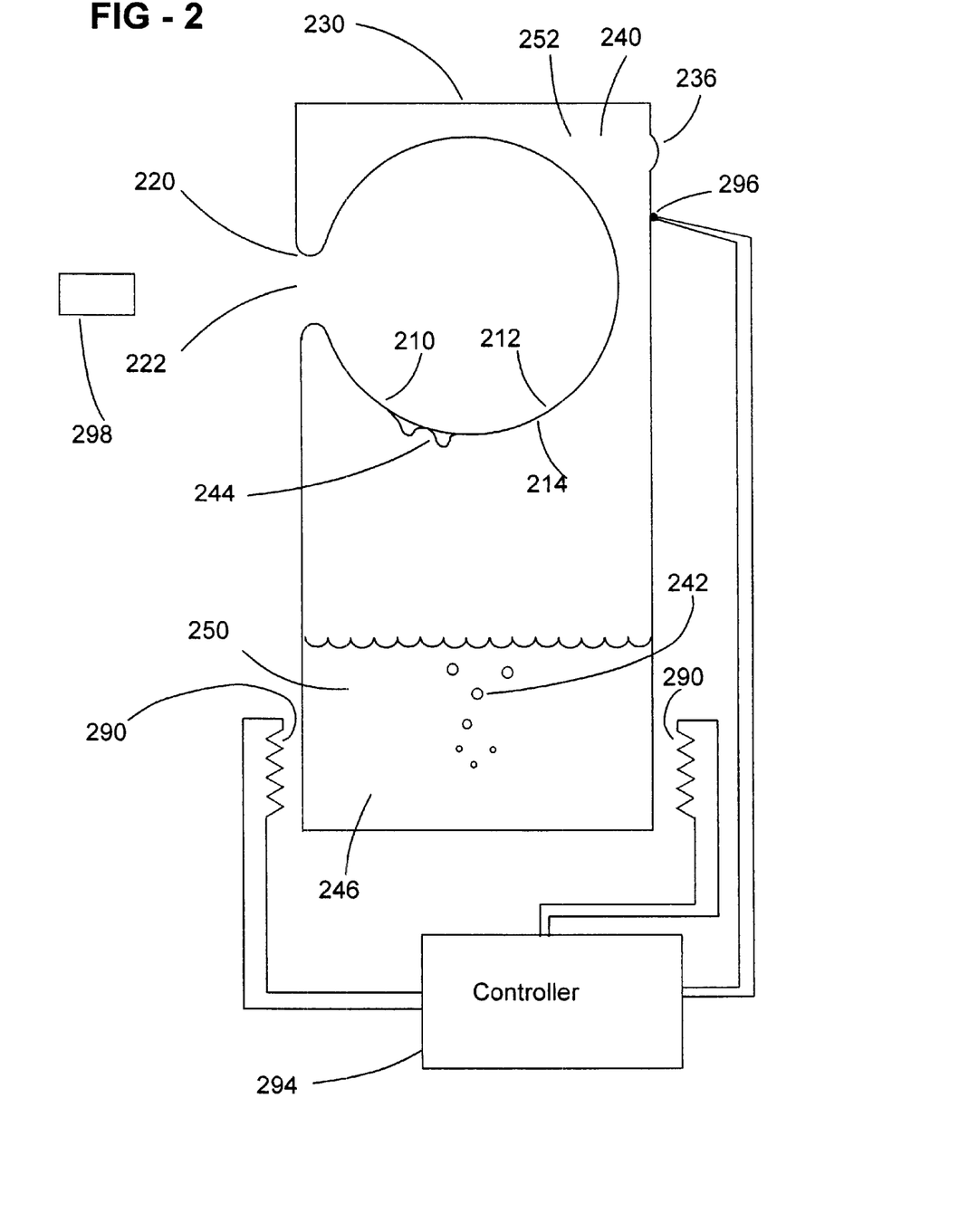
FIG. 2 shows a cross-section of FIG. 1.

The present invention is illustrated in FIG. 1 three-dimensionally, and in FIG. 2 as a cross-section of FIG. 1. It comprises a plate 210 which has two sides or surfaces. One of those surfaces is a thermally radiating surface 212. The other surface 214, the opposite side of the plate from the thermally radiating surface 212, is exposed to condensing vapors. The radiating surface 212 may preferably have surface properties or be treated or coated to have surface properties of a good radiator, i.e., high emissivity. In practical terms this means black and dull (not shiny). The opposing condensing vapor surface 214 may preferably have surface properties or be treated or coated to have surface properties which are conducive to condensation in a preferred regime such as dropwise condensation. Both of these types of surface properties or treatments or coatings are known in the respective arts.

Typically the plate 210 is curved and is oriented such that the thermally radiating surface 212 is the concave or interior surface, so as to resemble the blackbody receiver described earlier. The plate 210 may be made of formed or spun sheet metal, for example. Preferably the plate, if curved, is spherical or nearly spherical, although it does not have to be, and preferably it forms most of a sphere. If the plate 210 forms most of a sphere or enclosure, the region inside may be referred to as a semi-enclosed or interior region. Preferably the plate 210 is somewhat thin in the direction denoting the distance from the radiating surface 212 to the condensing surface 214, compared to its dimensions in the other two directions. While thinness is not an absolute requirement, there is some usefulness in thinness in that it will minimize any temperature differences related to conduction of heat through the thickness of the plate such as are described later. The only other requirement relating to the thinness or thickness of the plate 210 is that it be structurally capable of withstanding any needed pressure differences.

The condensing surface 214 is the convex or exterior surface of plate 210. Assuming that the plate is curved to define an interior region with a radiating surface 212 and an exterior surface with a condensing vapor surface 214, and assuming that the plate curves around so as to form more than half of an enclosed region, the edges of the plate 210 define one opening 222. That opening is the opening through which thermal radiation is emitted to a device 298 which is being calibrated or tested. Preferably the opening has a diameter, or other dimensions if it is non-circular, which are somewhat small compared to the diameter or other dimensions of the interior region which is enclosed by the plate. This is by analogy to the design of the blackbody receiver already described. The opening is defined by a lip 220, which is the place where the plate 210 connects to enclosure 230. Lip 220 may be circular. Enclosure 230, together with the plate 210, forms a closed volume contained between plate 210 and enclosure 230. The closed volume serves as a pressure vessel which contains the working fluid, which exists as both vapor 240 in the vapor region 252 and liquid 246 in the evaporator region 250. Bubbles 242 of vapor may form in the liquid region as boiling takes place. Drops 244 of condensate (condensed liquid) may form on condensing surface 214 of plate 210.

It would be possible for the enclosure 230 to follow approximately the same shape as the plate 210 while simply being of a slightly larger size. It is also possible, as shown for simplicity in FIG. 1, for the enclosure 230 to be made up of segments which are flat. The shape as illustrated is approximately rectangular in any cross-section. Preferably the enclosure 230 extends away from the plate 210 in one direction, which is preferably vertically downward from the plate 210. This extended region collects condensate and is the evaporator region 250. The condenser region 252 and the evaporator region 250 and any extra region between them (which might be neither evaporating nor condensing) together form a single enclosed volume all of which is filled by the working fluid in some combination of liquid and vapor. The condenser region 252 and the evaporator region 250 together function as a heat pipe. The lower region 250 is a collecting place for liquid, and that region is in thermal contact with a heater or heat source 290 which causes evaporation of some of the liquid of the working fluid. The heater 290 would commonly be an electric resistive heater for ease of control, but other types of heat sources are also possible. The heater 290 is shown as being external to the evaporator region, which is advantageous in terms of simplicity and reliability because it requires no penetrations through a pressure boundary (the enclosure 230). A heater could also be directly exposed to the liquid, having appropriate penetrations through the enclosure 230. The fact that the evaporator region 250is vertically below the condenser region 252 means that drops 244 of condensate which form on the condensing surface 214 of the plate 210 can fall by gravity to the evaporator region 250. This is the most favorable design and results in the greatest heat flow capacity. However, this is not absolutely necessary.

The cross-section of the evaporator region 250 is shown as being the same as the cross-section of the condensing region 252. This is convenient although not necessary. The entire outer surface of the enclosure 230 may preferably be surrounded by thermal insulation (not shown, for clarity) to reduce heat loss, and this may in turn be enclosed for esthetic reasons by a cabinet (not shown, for clarity).

The working fluid would be selected based mainly on the desired operating temperature of the blackbody source, in much the same way as the working fluid is selected for heat pipes as is known in the art of heat pipes. The characteristics of a fluid suitable for heat pipe use include a distinct boiling point in the desired temperature range, a useful amount of latent heat of evaporation, ability of the liquid to flow back to the evaporator as influenced by its surface tension and viscosity, chemical stability of the fluid at the desired operating temperature, and compatibility with the materials of construction of the enclosure. The candidate fluids would be the ones commonly used as heat pipe working fluids, including ammonia, alcohols, water, fluorocarbons, chlorocarbons, chlorofluorocarbons, hydrochlorofluorocarbons, other halocarbons and halogenated hydrocarbons, other organic fluids, and liquid metals (mercury, sodium, potassium, lithium, rubidium, cesium) and azeotropes of appropriate combinations of those fluids. Azeotropes are multi-component solutions whose behavior resembles that of pure substances with respect to having well-defined boiling and evaporation points. Heat pipes designed using low melting point low boiling point metals can operate at temperatures as high as approximately 1200 C. Thus, devices in accordance with the present invention should be capable of acting as sources of thermal radiation over a wide range of temperatures from approximately room temperature up to the range of 1200 C.

The pressure of the working fluid inside the pressure vessel can actually be either subatmospheric or above atmospheric, depending on the temperature and the properties of the working fluid. The heat pipe principle works over a range of internal pressures, although in general it is likely to work somewhat better at higher pressures. There may be provided a burst disc 236 or the like located in the boundary of enclosure 230 to prevent the pressure inside the enclosure from reaching undesirable levels if the temperature becomes undesirably high. Some distance away from opening 222, and preferably along an axis perpendicular to the plane of opening 222 and centered on opening 222, is device 298, such as an infrared thermometer or detector, which receives thermal radiation for the purpose of being calibrated or tested.

While all of the above techniques of the present invention help to assure that the temperature of the radiating surface is uniform over its surface area, they do not address the question of whether that temperature is also steady with respect to time. For many purposes it would also be important that the temperature be steady with respect to time. This can be accomplished if the heat delivered by the heater 290 is controlled by a controller 294 which either adjusts the power level of the heater or turns it on and off appropriately. Such action would be taken in response to a signal (feedback) from a sensor 296 which indicates the temperature. The sensor 296 could be a thermocouple or thermistor or resistance temperature detector other temperature sensor. Sensor 296 is shown mounted on an exterior surface of enclosure 230. It could instead be mounted directly on the radiating surface 212, which would provide a more accurate temperature reading but might be less convenient for construction because the sensor wires would have to follow a more difficult path to reach controller 294, such as by exiting through opening 222. A somewhat more indirect indication of temperature could be obtained from the pressure inside the enclosure, as measured by a pressure transducer, using the known relation between pressure and temperature at saturation (two-phase equilibrium) conditions for the working fluid. A controller 294 to switch or adjust the power to the heater could be based on the PID (proportional-integral-derivative) controller technology, or could use fuzzy logic controller technology. Such controllers and others are known in the art and are available from vendors such as Omega Engineering, Stamford, Conn., or from Love Controls (Dwyer Instruments, Michigan City, Ind.).

Figure 3:
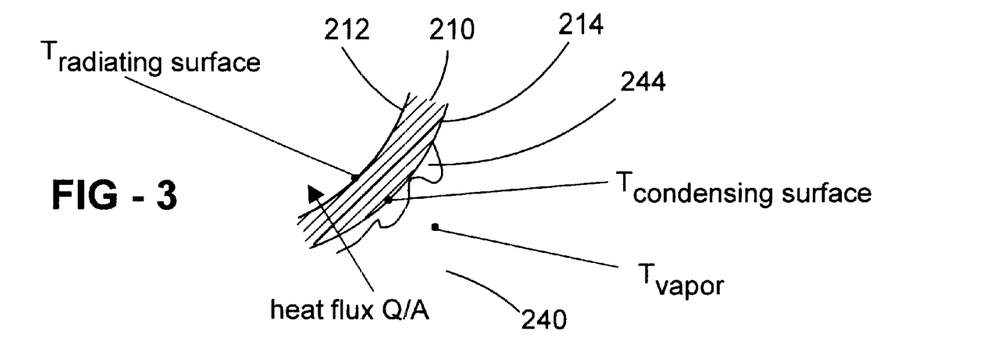
FIG. 3 identifies various temperatures in the vicinity of the plate.

The following reasoning explains why good temperature uniformity should be achieved in the present invention. Everywhere in the condensing region between the enclosure 230 and the condensing surface 214 of plate 210, the pressure should be essentially identical because the device is preferably designed with sufficiently large internal spaces and flow passageways for the working fluid so that there is no significant pressure inequality from place to place within the vapor region of the enclosed volume. Thus, the temperature of the vapor, which is at saturation conditions, should also be everywhere identical. The temperature of the radiating surface 212 is the temperature of the condensing vapor minus whatever temperature drop is associated with the passage of any heat flux through the thermal resistance of the condensation layer (described by the condensing heat transfer coefficient) and the thermal resistance of the solid material of plate 210 (described by the thermal conductance for conductive heat flow from the condensing surface to the radiating surface). The various temperatures are labeled in FIG. 3. If the heat flux (heat flow per unit time per unit area perpendicular to the direction of heat flow) is Q/A, then the temperature drop across the condensation layer is delta $T_{condensation} = T_{vapor} - T_{condensingsurface} = (Q/A)/h_{condensation}$, where $h_{condensation}$ is the condensing heat transfer coefficient, $T_{vapor}$ is the temperature of the vapor, and $T_{condensingsurface}$ is the temperature of the surface 214 of plate 210 which is exposed to the condensing vapor. Similarly, the temperature drop due to conduction across plate 210 is delta $T_{conduction} = T_{condensingsurface} - T_{radiatingsurface} = (Q/A)/(k/t)$, where k is the thermal conductivity of the material of plate 210, and t is the thickness of plate 210 (the distance between condensing surface 214 and radiating surface 212), and $T_{radiatingsurface}$ is the temperature of the radiating surface 212. The total amount by which the temperature of the radiating surface is different from the vapor temperature is the sum of these two quantities. The total amount of temperature difference is proportional to the local heat flux Q/A. In condensing heat transfer (especially dropwise), the heat transfer coefficient is a rather large one, i.e., favorable for maintaining temperature uniformity. Also, the plate 210 is preferably designed to be both thin and of a material with a high thermal conductivity. Thus, the total amount of temperature difference should be small but in any event it is proportional to heat flux. Thus, nonuniformities in that total amount of temperature difference can be reduced by making the heat flux as uniform as possible. The temperature of the vapor at the condensing side is expected to be uniform because, as previously described, it is at saturation cinditions and the pressure should be everywhere uniform. The only remaining influence that should be able to cause temperature nonuniformity of the temperature of the radiating surface should be that due to the possible difference from one location to another of the heat flux through the plate.

Figure 4:
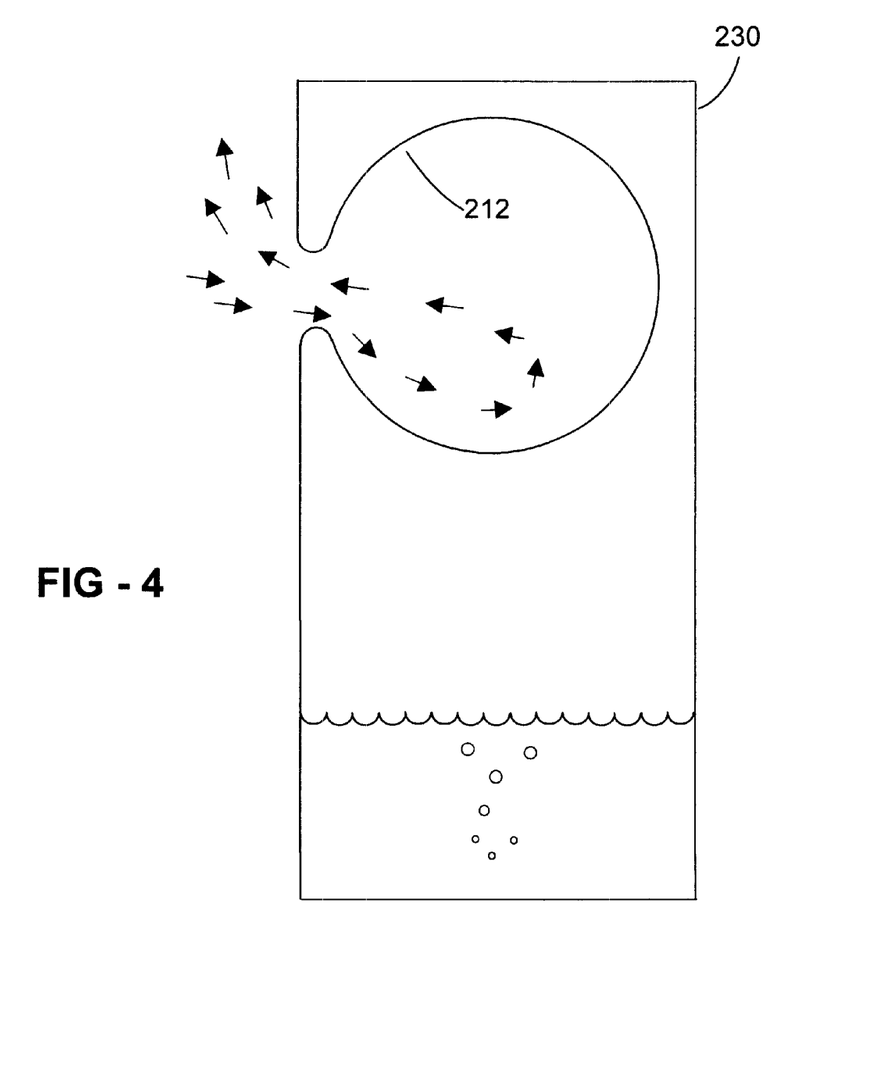
FIG. 4 shows convective flow patterns near the opening of the blackbody source for a blackbody source without a transition region.

Thus, the last step toward achieving uniformity of temperature of the radiating surface 212 is to assure that the heat flux through that surface is uniform. The heat flux through the plate is determined in large part by the difference between the temperature of the radiating surface 212 and the temperature of the adjacent air typically in the concave interior semi-enclosed region next to the radiating surface 212. The heat transfer would be described by a heat transfer coefficient for convection to the air. (There may also be some contribution due to the amount of radiation which is radiated from a local region of the plate outward to the device 298 or other parts of the exterior world. The local amount of such radiation will be greatest at the surface immediately opposite opening 222, and less for other locations because of geometric considerations embodied in the view factor.) Thus, it is important to achieve approximate uniformity of temperature of the air inside the concave region. Temperature nonuniformity at the radiating surface 212 is influenced partly by the flow of atmospheric air at ambient temperature into the interior region in the form of convective flow patterns driven by differences in the temperature (really, density) of the air. Air from the interior region, which is hotter than ambient, will tend to flow out through the opening in a rising plume, and its place will be taken by an inflow of ambient-temperature air which gravitates toward the bottom of the interior region. Such a flow pattern (estimated) is illustrated in FIG. 4. This flow pattern works against the desired uniformity of temperature over the radiating surface. As a result, in the absence of any other correction, the air in the lower region of the blackbody source radiating surface is likely to be cooler than the air in the upper region. This draws a larger heat flux through the plate in the cooler-air region, which would reduce the temperature of the radiating surface in the cooler-air region (the lower part).

Figure 5:
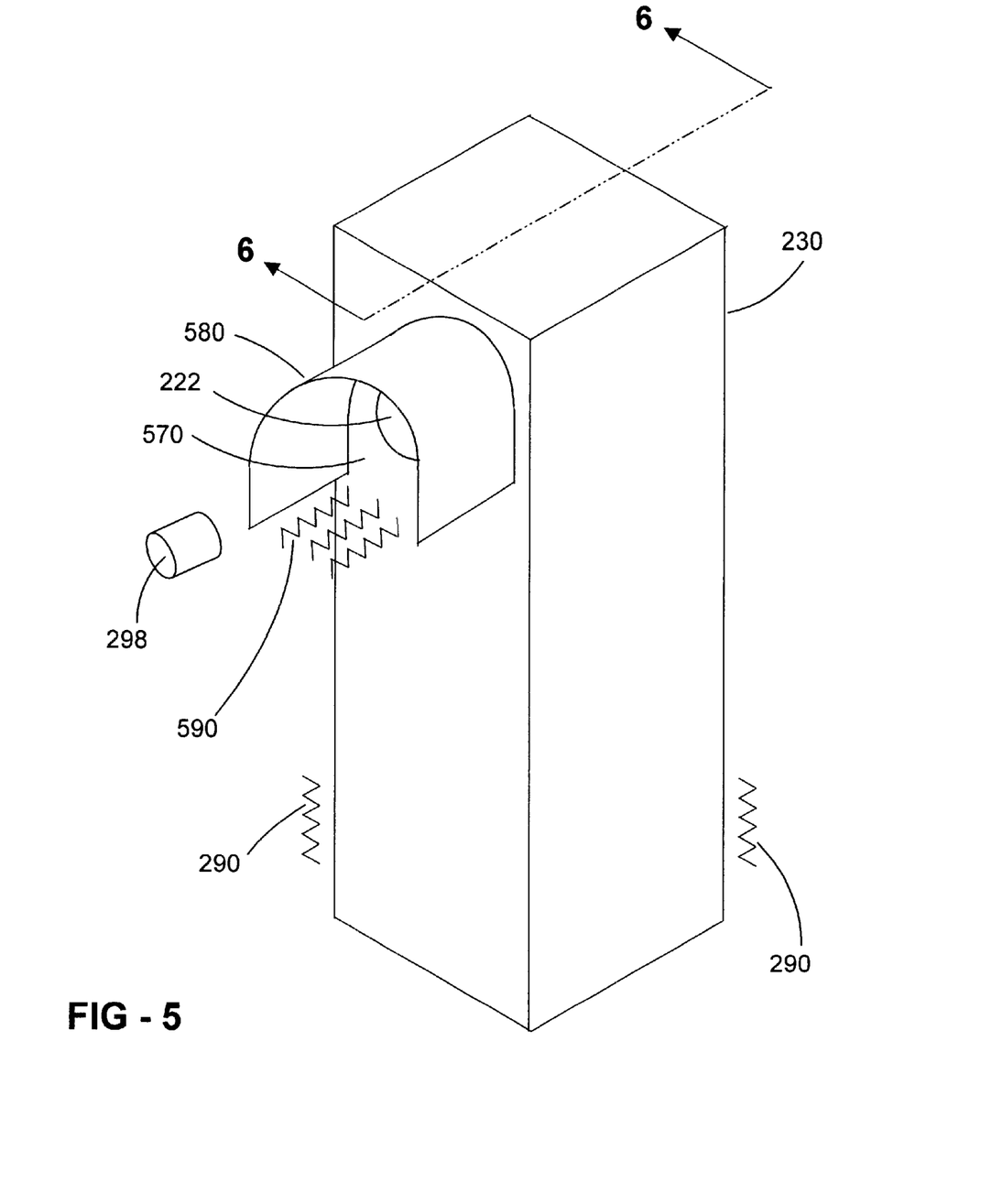
FIG. 5 shows the blackbody source of the present invention as in FIG. 1 but with a transition region and air heater added to control convective flow patterns.

Convective flows occur, due to density differences, whenever air of one temperature (more specifically, density) adjoins air of another temperature (more specifically, density). However, the undesirable effect which this produces may be counteracted by having convective flows relating to the meeting of different-temperature (i.e., different density) gases take place outside the region which needs to be thermally uniform to assure good quality thermal radiation. Convective flows in a similar situation are described in my copending patent application Ser. No. 09/209,326, which is hereby incorporated by reference. Prevention of convective flows where they are not wanted may be accomplished by creating a transition region 570 in front of the opening 222, and by providing an appropriate air heater 590 for air in that region. Such an arrangement is shown in FIG. 5. Preferably the air heater 590 is located vertically below the opening 222, because the natural direction of motion of heated air is upward. Preferably the air heater 590 is such that air can flow through it while being heated, i.e., air heater 590 may be porous, perforated, have open space between heater wires, etc. Air heater 590 may be powered by its own power supply and control system (not shown), similar to control system 294. Transition region 570 is geometrically defined by baffle 580, which blocks the flow of air in certain places. The baffle 580 preferably has an impervious top which is located above the opening 222, and impervious sides which are located alongside opening 222. Baffle 580 is shown as having a cross-section of an inverted U, although other cross-sections are also possible. Baffle 580 extends out from the front of enclosure 230 by a distance (for example, a small multiple of the diameter of opening 222) suitable to create the desired flowfield in the air adjacent to opening 222. The intent of the baffle 580 creating transition region 570 is to somewhat confine what would otherwise be a buoyant region of elevated-temperature air and to promote creation of a subregion of stagnant or nearly stationary air immediately adjacent to the opening 222. The end of baffle 580 facing toward enclosure 230 is preferably located close to or touching enclosure 230 so as to minimize or prevent the flow of air between baffle 580 and enclosure 230. The other end away from enclosure 230 must be open to permit the passage of radiation to radiation receiving device 298, and so that open end also permits the convective flow of air. Air heater 590 is preferably electrical although it would also be possible for heat for air heater 590 to be drawn by conduction from enclosure 230 or obtained from some other kind of heat source. It would even be possible for baffle 580 to be heated (in addition to air heater 590 heating the air), either electrically or by heat drawn conductively from enclosure 230.

Figure 6:
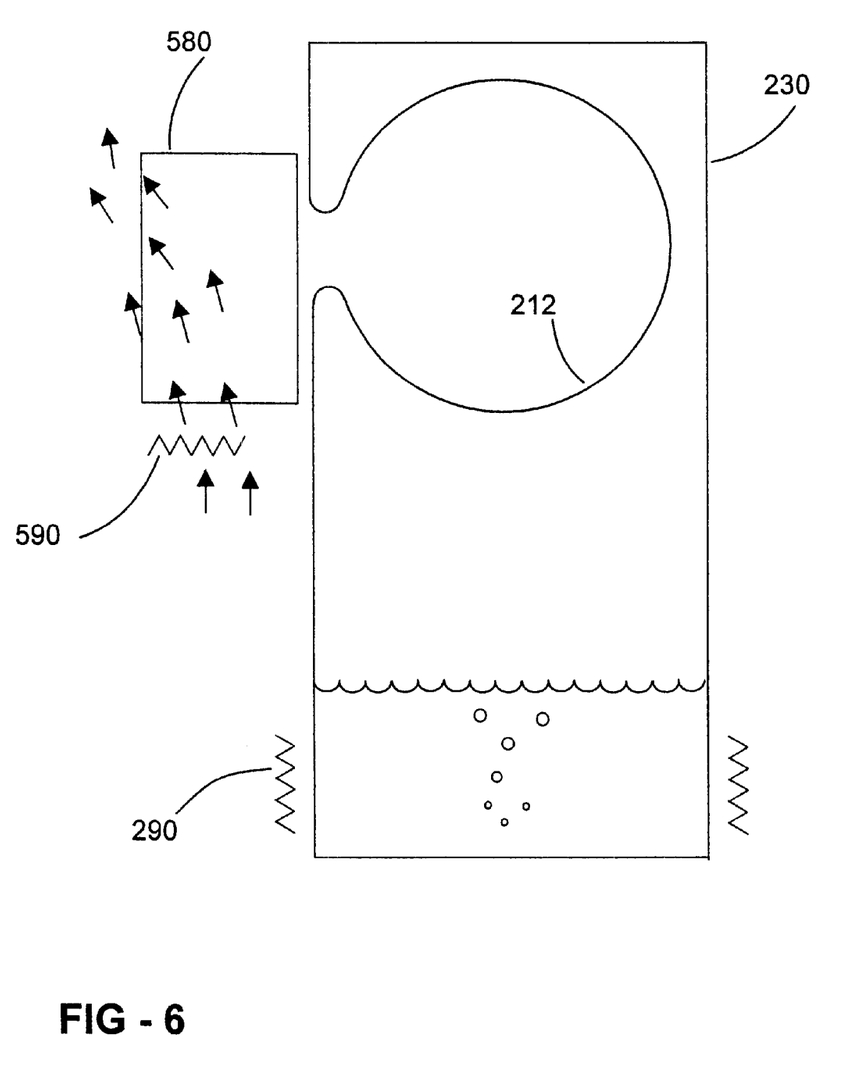
FIG. 6 shows convective flow patterns near the blackbody source of the present invention with the addition of the transition region and air heater.

The use of air transition region 570 would eliminate or greatly reduce the inflow of cold air into the region enclosed by the radiating surface 212. Preferably the air in the air transition region 570 is heated to approximately the same temperature as the interior of the blackbody source or the radiating surface 212, but any temperature between room temperature and the temperature of the radiating surface 212 will improve the situation compared to the situation in the absence of any air transition region. It may be desirable for the heater 590 and the baffle 580 to be shaped and dimensioned such that they are at least partly out of the field of view of the instrument or device 298 being calibrated or tested, i.e., somewhat away from the immediate vicinity of the opening 222. The flowfield (estimated) which can be achieved with such a transition region is shown in FIG. 6. It can be seen that while convective flow exists, it takes place essentially only in the transition region 570, away from the opening 222. At the location of the lip 220 or opening 222, the gas remains essentially stationary and is relatively hot and so there is not a flow bringing cool exterior air into the concave interior semi-enclosed region defined by the radiating surface 212 of the plate 210. This is an improvement over the situation which occurs in the absence of such a transition region.

Figure 7:
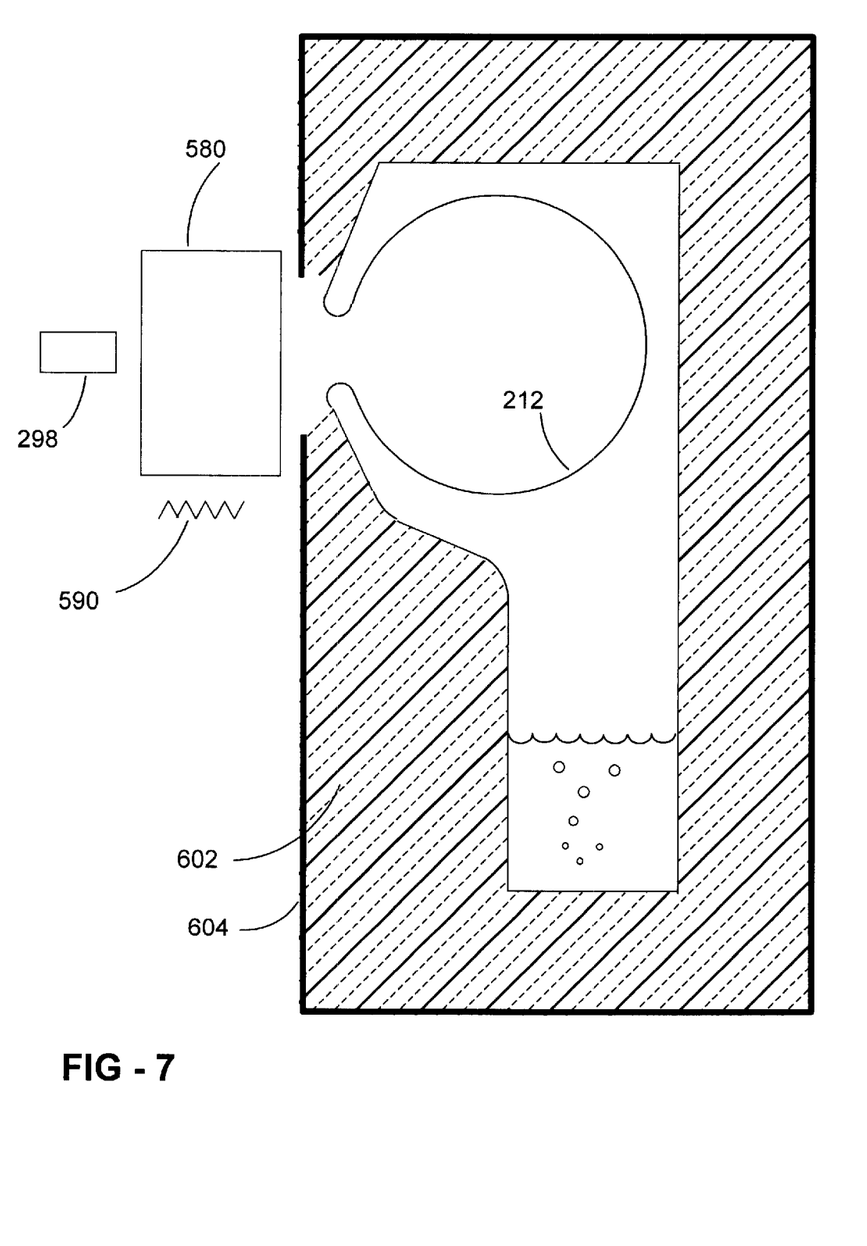
FIG. 7 shows the invention in cross-section in a more finished design with contouring, thermal insulation, and a cabinet.

FIG. 7 shows the present invention in cross-section in a more finished design with contouring, thermal insulation 602 surrounding enclosure 230, and a cabinet 604 surrounding thermal insulation 602. Both thermal insulation 602 and cabinet 604 leave unblocked a path in the vicinity of opening 222 along which thermal radiation travels to device 298. Again assuming that the evaporator region 250 is located below the condensing region 252, preferably the interior of enclosure 230 below condensing region 252 has a continuous downward slope, as shown, inducing condensate to fall or roll down to the evaporator without accumulating anywhere else as puddles.

Variations of the above may also be practiced. For example, other shapes of radiating surface (e.g., cylindrical rather than spherical) are possible. Other shapes of the enclosure 230 are also possible. Various working fluids are possible. Any type of heat source (electrical resistive or other) would serve appropriately as the heat source 290. The air transition region could have various shapes. It could involve a blower although in general that should not be necessary. It would be possible (although less convenient) to use gases other than air having a different molecular weight to suppress ocnvective flow, as described in my referenced copending application. Although it should not be necessary, auxiliary heaters could be applied to the radiating surface of the plate. The plate has been described as nearly spherical with a relatively small opening, but these properties are not necessary. In the illustrations it has been shown that the evaporator is spatially distant or removed from the condenser. However, it is also possible for the evaporator to be more co-located with the condenser in the nature of an isothermalizing pad wrapped around the radiating surface. In this event gravity would not suffice to return condensate to the evaporator, and other mechanisms such as surface tension driven capillary flow would have to be designed into the device.

Although several embodiments of the invention have been disclosed and described in detail herein, it should be understood that this invention is in no sense limited thereby and its scope is to be determined by that of the appended claims.

I claim:

1. A source for emitting thermal radiation, comprising
   a plate having a thermally radiating surface and an opposing surface which is exposed to condensation of vapor of a working fluid; and
   an enclosure joined to all edges of the plate, which together with the plate defines a closed volume containing the working fluid;
   the closed volume additionally comprising an evaporator region in which liquid of the working fluid is evaporated, to produce the vapor, by heat supplied from a heat source;
   wherein the edges at which the plate joins the enclosure define an opening through which the thermal radiation is emitted;
   a baffle and an air heater located close to the opening, whereby a transition region of heated air is maintained adjacent to the opening on the side away from the thermally radiating surface.

2. The apparatus of claim 1, wherein the plate is curved having a concave surface and a convex surface, and the thermally radiating surface is the concave surface of the plate.

3. The apparatus of claim 2, wherein the concave surface is essentially a portion of a sphere.

4. The apparatus of claim 1, wherein the thermally radiating surface has a high emissivity.

5. The apparatus of claim 1, wherein the plate and the enclosure are capable of withstanding a pressure difference between interior and exterior of the closed volume.

6. The apparatus of claim 1, wherein the evaporator region is located vertically lower than the plate, whereby movement of condensed liquid from the plate to the evaporator region occurs by gravity.

7. The apparatus of claim 1, wherein the working fluid is selected from the group consisting of ammonia, alcohols, water, fluorocarbons, chlorocarbons, chlorofluorocarbons, hydrochlorofluorocarbons, other halocarbons and halogenated hydrocarbons, other organic fluids, mercury, sodium, potassium, lithium, cesium, rubidium, other liquid metals, and azeotropes of appropriate combinations of those fluids.

8. The apparatus of claim 1, further comprising means for measuring the temperature of the thermally radiating surface or of another part of the enclosure.

9. The apparatus of claim 8, wherein power to the heat source is controlled by a control system in response to the measured temperature.

10. The apparatus of claim 1, wherein the baffle is heated.

11. The apparatus of claim 1, wherein the baffle has impervious top and sides.

12. The apparatus of claim 1, wherein the air heater is located below the opening.

13. The apparatus of claim 1, wherein the transition region of heated air is dimensioned such that the air immediately adjacent to the opening in the direction away from the thermally radiating surface is essentially stationary.

14. The apparatus of claim 1, wherein the temperature of the air in the transition region of heated air is maintained above ambient temperature but less than or equal to the temperature of the thermally radiating surface.

* * * * *